(12) United States Patent
Irving et al.

(10) Patent No.: US 8,263,182 B2
(45) Date of Patent: Sep. 11, 2012

(54) INKJET PRINTING SYSTEM, INK, AND PROCESS

(75) Inventors: Mark E. Irving, Rochester, NY (US); Paul D. Zimmerman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 788 days.

(21) Appl. No.: 12/250,607

(22) Filed: Oct. 14, 2008

(65) Prior Publication Data
US 2010/0092669 A1    Apr. 15, 2010

(51) Int. Cl.
*B05D 5/00* (2006.01)
(52) U.S. Cl. ...................................... 427/256
(58) Field of Classification Search .................... 427/256
See application file for complete search history.

(56) References Cited

U.S. PATENT DOCUMENTS

| 2005/0020730 A1 | 1/2005 | Valentini et al. | |
| 2008/0206465 A1 * | 8/2008 | Han-Adebekun et al. | 427/256 |

FOREIGN PATENT DOCUMENTS

| EP | 0 819 737 | 4/2003 |
| EP | 0 802 247 | 7/2003 |
| WO | 2008/106145 | 9/2008 |

* cited by examiner

*Primary Examiner* — Kuo-Liang Peng
(74) *Attorney, Agent, or Firm* — Arthur E. Kluegel; Andrew J. Anderson

(57) ABSTRACT

An inkjet printing system comprises an inkjet printer and an inkjet ink comprising water, a self-dispersing carbon black pigment, and a water soluble polymer containing carboxylate groups, wherein:
the carbon black pigment comprises greater than 11 weight % volatile surface functional groups; and
the ink also contains an organic base having a pKa>7.5 and an optional inorganic base in combined amounts sufficient to provide alkaline equivalents of at least 150% of the acid equivalents of the water soluble polymer;
provided the equivalents of the organic base are greater than or equal to the equivalents of the inorganic base.

26 Claims, 2 Drawing Sheets

INKJET PRINTING SYSTEM, INK, AND PROCESS

FIELD OF THE INVENTION

The present invention relates to an inkjet system employing an ink containing water and particular polymeric, carbon black self-dispersed pigment, and alkaline components.

BACKGROUND OF THE INVENTION

Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while un-imaged droplets are caught and returned to an ink sump. Inkjet printers have found broad applications across markets ranging from desktop document and photographic-quality imaging, to short run printing and industrial labeling.

The inks used in the various inkjet printers can be classified as either dye-based or pigment-based. A dye is a colorant that is dissolved in the carrier medium. A pigment is a colorant that is insoluble in the carrier medium, but is dispersed or suspended in the form of small particles. These small particles can be stabilized against flocculation and settling by the use of distinct dispersing agents such as surfactants, oligomers, or polymers, or they can be directly functionalized to provide a self-dispersing characteristic. In either case the carrier medium can be a liquid or a solid at room temperature. Commonly used carrier media include water, mixtures of water and organic co-solvents, and high boiling organic solvents such as hydrocarbons, esters, ketones, alcohols, and ethers.

Pigment-based inkjet inks are often preferred over dye-based inkjet inks because of the superior image stability typically observed with the pigment-based inks. Self-dispersed pigments in turn are often preferred over surfactant-dispersed, oligomer-dispersed or polymer-dispersed pigments because of their greater stability to a variety of ink formulations and environmental keeping conditions. Self-dispersed pigments are typically used when high density and sharp images are required such as for the printing of text and graphics, and are especially useful when printing on to plain papers (ie. papers not specifically designed to render photographic quality images).

Self-dispersed pigments useful for inkjet printing have been prepared by a number of different processes. U.S. Pat. Nos. 5,554,739; 5,803,959; and 5,922,118 disclose covalent functionalization of pigment surfaces using diazonium compounds. U.S. Pat. Nos. 5,609,671; 5,718,746; 6,099,632; and 7,232,480 describe anionic self-dispersed pigments prepared by a hypochlorite oxidation process. U.S. Pat. No. 6,852,156 describes anionic pigments prepared by ozone oxidation.

Among the different types of self-dispersed pigments, those having a high degree of surface functionalization provide advantages in the printing of inkjet images. US Patent Publication No. 2007/0028800 discloses self-dispersed pigments having a charge equivalence of at least 0.5 mEq/g that have been carboxylate functionalized. U.S. Pat. No. 5,861,447 and US Patent Publication No. 2008/0206465 disclose self-dispersed pigments having greater than 11 weight % volatile surface functional groups.

Although self-dispersed pigments have a number of advantages when used in inkjet inks, they also present disadvantages. For example, self-dispersed pigment inks are particularly susceptible to smearing, especially with respect to highlighter markers used in the marking of text images. It known in the art of self-dispersed pigment inks to add water-soluble polymers, neutralized with organic or inorganic bases, to improve the smear resistance of the printed images. Typically, the amount of base used to neutralize the ionizable groups of the water-soluble polymers is maintained at a level less than or equal to 100% of the ionizable groups. The presence of polymers in the inks can present additional limitations in ink performance. The presence of significant amounts of polymers in a self-dispersed pigment ink can reduce the amount of achievable density in the printed image.

Inkjet printing systems impose additional requirements on the design of ink formulations in order to achieve reliable ejection performance from the inkjet printhead. Polymers present in the ink can cause severe degradation in jetting performance of the ink due to the interaction with printhead materials such as the heater surface in a thermal inkjet printer. One particularly challenging problem with inkjet printers is known in the art as latency. Latency refers to the conditions where ink ejection from the printer is in a state of idle or where time between successive ink ejections from the printhead nozzles is long. During the time interval where ink ejection is idle the volatile ink components such as water, undergo evaporation in and around the printhead nozzles. Under such conditions components normally solubilized within the water become less soluble in the remaining components, such as non-volatile humectants. Water-soluble polymers are particularly susceptible to the evaporation of water during latency events resulting in the formation of polymer deposits on the walls, nozzle bore, or surfaces of the ejector. These polymer deposits, herein referred to as nodules, can directly lead to ejection problems such as, for example, velocity losses and directionality issues that detract from the overall image quality of the printed image. In extreme cases, the polymer deposits prevent ejection of ink altogether thereby causing catastrophic failure of the printer.

There remains a need to provide an ink composition comprising self-dispersing pigments that can provide high print density and text sharpness when printed onto an ink receiving medium and which reduces polymer deposits on components of the printing system during periods of latency.

SUMMARY OF THE INVENTION

The invention provides an inkjet printing system comprising an inkjet printer and an inkjet ink comprising water, a self-dispersing carbon black pigment, and a water soluble polymer containing carboxylate groups, wherein:

the carbon black pigment comprises greater than 11 weight % volatile surface functional groups, and the ink also contains an organic base having a pKa>7.5 and an optional inorganic base in combined amounts sufficient to provide alkaline equivalents of at least 150% of the acid equivalents of the water soluble polymer, provided the equivalents of the organic base are greater than or equal to the equivalents of the inorganic base."

Alternate embodiments include the ink itself and a printing process employing the printing system. The system provides high print density and text sharpness when printed onto an ink receiving medium and reduces polymer deposits on components of the printing system during periods of latency.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
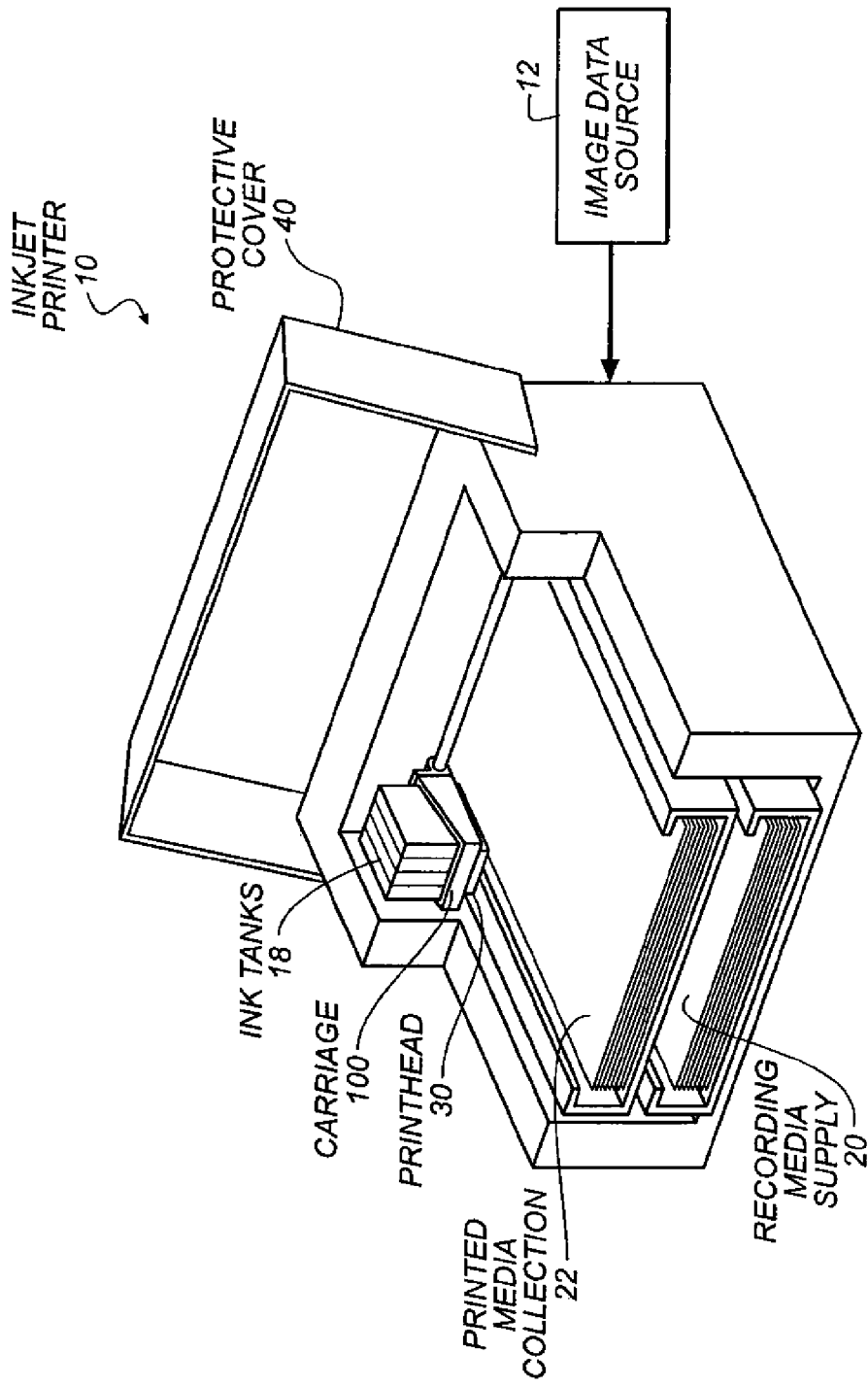
FIG. 1 is a schematic view of an inkjet printing system of the invention.

As used herein, self-dispersing pigment is defined as a pigment that retains a state stably dispersed in a liquid carrier medium, such as water, a water-soluble organic solvent, or a liquid mixture thereof, without requiring use of any dispersing agent.

The self-dispersed pigment useful in the present invention is, for example, a pigment in which at least one anionic group, has been bonded directly to the surface of the pigment. In one embodiment the pigment is a carbon black pigment that has been surface modified to produce carboxylate groups on the surface of the pigment. The surface-modified pigment can be one produced by a method involving wet oxidation with a hypohalous acid or a salt thereof, by treatment in a plasma, or by oxidation in the presence of ozone. Hypohalous acids or salts thereof include sodium hypochlorite, potassium hypochlorite, sodium hypobromite, and potassium hypobromite. Among them, sodium hypochlorite is particularly preferred from the viewpoints of reactivity and cost. Specifically, the method involving wet oxidation with a hypohalous acid or a salt thereof may be carried out as follows.

A pigment and a surface modifier (for example, sodium hypochlorite) are heated and dispersed or stirred in a suitable amount of water. For example, a ball mill, an attritor, a colloid mill, or a sand mill with glass, zirconia, alumina, stainless steel, magnetic, or other beads added thereto may be used for stirring. In this case, preferably, the pigment may be previously ground to a desired particle size. Alternatively, the pigment may be reacted with the surface modifier while grinding the pigment. The grinding may be carried out by means of a rotary homogenizer or an ultrasonic homogenizer. Beads and coarse particles are separated from the dispersion after stirring and oxidation, followed by the removal of by-products of the oxidizing agent in order to perform purification. Thus, an aqueous pigment dispersion is obtained. If necessary, for example, concentration by a separation membrane or the like, filtration through a metallic filter or a membrane filter, classification by centrifugation, or neutralization with a hydroxide of an alkali metal salt or an amine may be carried out. A modified carbon black produced by the hypohalous oxidation method generally as described in U.S. Pat. No. 6,488,753 has a high surface carboxylic acid content. As a result, the dispersibility of the modified carbon black in water is very high. Commercially available products may be used as the above pigment, and desirable examples thereof include BONJET® CW-1, BONJET® CW-2 and BONJET® CW-3 manufactured by Orient Corporation of America, and AQUA-BLACK® 162 and AQUA-BLACK® 164 from Tokai Carbon Co., Ltd.

The following water-insoluble pigments are among those useful as substrates suitable for chemical modification, as described previously, into the pigments in the practice of the invention; however, this listing is not intended to limit the invention. The following pigments are available from Cabot Corp.: MONARCH® 1400, MONARCH® 1300, MONARCH® 1100, MONARCH® 1000, MONARCH® 900, MONARCH® 880, MONARCH® 800, and MONARCH® 700. The following pigments are available from Ciba: IGRALITE® RUBINE 4BL. The following pigments are available from Columbian: RAVEN® 7000, RAVEN® 5750, RAVEN® 5250, RAVEN® 5000, and RAVEN® 3500. The following pigments are available from Evonik: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: TI-PURE® R-101. The following pigment is available from Hoechst: Permanent Rubine F6B. The following pigment is available from Sun Chemical: LHD9303 Black.

The surface chemistry of the carbon black pigment surface after treatment affects its performance on plain paper, since all carbon blacks have chemisorbed oxygen complexes (i.e., carboxylic, quinonic, lactonic, or phenolic groups) on their surfaces to varying degrees depending on the surface treatment conditions and mechanism. One way to characterize the amount of total surface groups, as well as the types of the surface groups (i.e., lactonic vs. carboxylic), is through the measurement of volatile surface functional groups. Thermogrametric analysis (TGA) is used to obtain such information by monitoring the weight change that occurs as the carbon black dispersion sample is being heated.

Specifically, volatile surface functional group and wt % volatile lactonic functional group are obtained following the 5 steps as described below:

Step 1) 95 mls of Reagent grade acetonitrile is added to the 5 mls of carbon black dispersion. This destabilizes the pigment suspension fairly rapidly.

Step 2) Collect the pigment cake by centrifugation at 7500 RPM for 1 hour and place it in a vacuum oven at 80 degrees C. for 16 hours Step 3) Place the pigment cake on the sample pan of a standard TGA oven to collect the weight loss using the following scan conditions: $1^{st}$ temperature range: 25° C. to 700° C., with nitrogen as the purge gas at a rate of 60 vv/min to the TGA oven and 40 cc/min to the TGA balance. The heating rate is 10° C./min. From the temperature range of 700° C. to 1000° C., switch to air at the same flow rate, with a heating rate of 10° C./min. The % of weight loss is recorded during the entire temperature scan range of 25° C. to 1000° C.

Step 4) Calculate the total weight % of volatile surface functional group on the carbon black dispersion surface by the following equation:

wt % volatile surface functional group=(weight loss 125° C.→700° C.)/(weight loss 125° C.→700° C.+weight loss 700° C.→805° C.). This is based on the physical understanding during the decomposition of carbon black pigment cake: weight losses before 125° C. are due to the volatile component in the sample; weight losses between 125° C. and 700° C. are associated with surface functional group on the carbon black dispersion particles; weight losses between 700° C. and 805° C. with the air as purge gas is due to the decomposition of carbon black through combustion.

Step 5) Calculate the weight % of lactone functional group on the carbon black dispersion surface using the following equation:

wt % volatile lactonic functional group=(weight loss 125° C.→400° C.)/(weight loss 125° C.→700° C.+weight loss 700° C.→805° C.). This is based on the results from pyrolytic gas chromatograph indicating that lactone groups decomposes around 358° C. and carboxyl groups decomposes around 650° C.

The self-dispersing pigments employed in the present invention have a volatile surface functional group content greater than 11 weight %, more desirably greater than 15%, and in one particularly useful embodiment greater than 18%. Furthermore, it is desirable that the pigment has a volatile lactonic functional group content greater than 5%. Pigments possessing these features have been found to provide improved print density on plain papers, good text quality, improved print durability such as waterfastness and excellent jetting performance over an extended printing period. They further provide good print uniformity over a wide variety of inkjet receivers.

The self-dispersing pigments of the present invention desirably contain anionic groups which are neutralized with an inorganic metal cation selected from sodium, potassium, lithium, and rubidium when supplied as a pigment dispersion prior to ink manufacturing.

The self-dispersing pigments of the present invention typically have a median particle diameter between 55 nm and 200 nm, desirably between 55 nm and 170 nm, and in one particularly useful embodiment between 55 and 140 nm. As used herein, median particle diameter refers to the 50th percentile of the particle size distribution such that 50% of the volume of the particles is composed of particles having diameters smaller than the indicated diameter. It is understood the pigment dispersion of the invention can be aggregates of primary carbon black particles smaller than the mean particle diameter from above. Typical primary particle sizes of the carbon black particles comprising the pigment dispersion may be in the range of 10 nm to 30 nm. The median particle diameter in the present invention is measured by using a Microtrac Ultrafine Particle Analyzer (UPA) 150 from Microtrac, Inc.

Polymer

Ink compositions of the present invention contain a water-soluble polymer having carboxylic acid groups. As used herein, the term "water-soluble" is defined as a sufficient number of ionizable groups on the polymer are neutralized with base such that the resultant polymer solution in water is visually clear. The carboxylic acid groups on the water-soluble polymers of the present invention are converted to carboxylate groups when neutralized with an appropriate base.

Desirable water-soluble polymers useful in the present invention are copolymers prepared from at least one ethylenically unsaturated monomer comprising a carboxylic acid group copolymerized with additional monomers described herein. The ethylenically unsaturated monomer comprising a carboxylic acid can be a mono carboxylic acid or a dicarboxylic acid. Examples of monomers useful as the first monomer include, but are not limited to, acrylic acid, methacrylic acid, fumaric acid, crotonic acid, itaconic acid, ethacrylic acid, mesaconic acid, cinnamic acid, carboxyethyl acrylate, carboxymethylacrylate, α-chloro-acrylic acid, and combinations thereof. Desirably, the first monomer is acrylic acid or methacrylic acid.

The monomer comprising a carboxylic acid group is typically polymerized at from 20 to 75 weight percent based on the total weight of the monomers used in the chain copolymerization of the water-soluble polymer, and more desirably from 20 to 50 weight percent. A particularly useful amount of first monomer comprising a carboxylic acid group used to prepare the polymer is from 20 to 35 weight percent of the total monomers.

The water-soluble polymer of the present invention is desirably obtained by copolymerizing at least one hydrophobic monomer with the carboxylic acid group containing monomers defined herein. Suitable hydrophobic monomers are, in principle, all hydrophobic monomers having a water-solubility of less than 60 g/l at 25° C., and which are copolymerizable with the carboxylic acid group containing monomers of the present invention. They include, in particular, the $C_1$-$C_{21}$-alkyl esters of monoethylenically unsaturated $C_3$-$C_6$ carboxylic acids, especially the esters of acrylic and methacrylic acid with $C_1$-$C_{21}$-alkanols or $C_5$-$C_{10}$ 4-cycloalkanols such as methanol, ethanol, n-propanol, isopropanol, n-butanol, isobutanol, 2-butanol, tert-butanol, n-pentanol, n-hexanol, 2-ethylhexan-1-ol, n-octanol, n-decanol, n-dodecanol, n-tridecanol, n-tetradecanol, n-hexadecanol, n-stearyl alcohol, n-behenyl alcohol, 2-propylheptan-1-ol, cyclohexanol, 4-tert-butylhexanol, 2,3,5-trimethylcyclohexanol, benzyl alcohol, phenyl alcohol, and phenylethyl alcohol. Further suitable non-ionizable hydrophobic monomers are the di-$C_1$-$C_{21}$-alkyl esters of ethylenically unsaturated dicarboxylic acids, such as maleic, fumaric, or itaconic acid, with the abovementioned $C_1$-$C_{21}$-alkanols or $C_5$-$C_{10}$-cycloalkanols, examples being dimethyl maleate or di-n-butyl maleate. Vinlyaromatic compounds such as styrene, α-methyl styrene, t-butyl styrene, ethylstyrene, isopropylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy)styrene, methoxystyrene, 4-methoxy-3-methylstyrene, dimethoxystyrene, chlorostyrene, dichlorostyrene, trichlorostyrene, bromostyrene, and vinyl toluene are also suitable as non-ionizable hydrophobic monomers, and their aromatic ring may be unsubstituted or substituted by one or more substituents selected from $C_1$-$C_{10}$-alkyl, halo, especially chloro, and/or hydroxyl, which in its turn may also be ethoxylated. The non-ionizable hydrophobic monomers additionally embrace the vinyl, allyl, and methallyl esters of linear or branched aliphatic carboxylic acids of 2 to 20 carbons, such as vinyl acetate, propionate, butyrate, valerate, hexanoate, 2-ethylhexanoate, decanoate, laurate, and stearate, and the corresponding allyl and methallyl esters. Additional suitable hydrophobic monomers include the vinyl, allyl and methallyl ethers of linear, or branched aliphatic alcohols of 2 to 20 carbons, such as vinyl methyl, ethyl, dodecyl, hexadecyl, and stearyl ethers. Suitable hydrophobic monomers also include olefins and halogenated olefins such as, dicyclopentadiene, ethylene, propylene, 1-butene, 5,5-dimethyl-1-octene, vinyl chloride, or vinylidene chloride.

The hydrophobic monomer is typically polymerized at from 20 to 90 weight percent based on the total weight percent of the monomer in the chain polymerization, and desirably from 30 to 85 weight percent. A particularly useful amount of hydrophobic third monomer used to prepare the polymer is from 40 to 80 weight percent of the total monomers in the chain polymerization. In one exemplary embodiment, the hydrophobic monomer is an alkylaryl acrylic monomer, such as benzyl methacrylate or benzyl acrylate. The hydrophobic monomer can be a mixture of two or more hydrophobic monomers and can be a mixture of an acrylic and a styrenic monomer, for example, styrene and benzyl methacrylate.

Furthermore, the water-soluble polymer useful in the present invention has a sufficient amount of acid groups in the molecule to have an acid number of between 100 and 270, desirably between 100 and 250, and in one particularly useful embodiment between 100 and 215. The acid number is defined as the milligrams of potassium hydroxide required to neutralize one gram of dry polymer. The acid number of the polymer may be calculated by the formula given in the following equation: Acid number=(moles of acid monomer)*(56 grams/mole)*(1000)/(total grams of monomers) where, moles of acid monomer is the total moles of all acid group containing monomers that comprise the polymer, 56 is the formula weight for potassium hydroxide and total grams of monomers is the summation of the weight of all the monomers, in grams, comprising the target polymer.

Desirable water-soluble copolymers may be styrene-acrylic copolymers comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160. Desirable polymers include, for example, styrene-acrylic acid, styrene-acrylic acid-alkyl acrylate, styrene-maleic acid, styrene-maleic acid-alkyl acrylate, styrene-inethacrylic acid, styrene-methacrylic acid-alkyl acrylate, and styrene-maleic acid half ester, wherein each type of monomer may correspond to one or more particular monomers. Examples of preferred polymers include but are not limited to styrene-acrylic acid copolymer, (3-methyl styrene)-acrylic acid copolymer, styrene-methacrylic acid copolymer, styrene-butyl acrylate-acrylic acid terpolymer, styrene-butyl methacrylate-acrylic acid terpolymer, styrene-methyl methacrylate-acrylic acid terpolymer, styrene-butyl acrylate-ethyl acrylate-acrylic acid tetrapolymer and styrene-(α-methylstyrene)-butyl acrylate-acrylic acid tetrapolymer. Commercially available polymers useful in the present invention include copolymers of styrene and/or alphamethyl styrene and acrylic acid and/or methacrylic acid (such as the JONCRYL® BASF or TRUDOT™ MeadWestvaco polymers) or styrene maleic anhydride and styrene maleic anhydride amic acid copolymers (such as SMA® 1440, SMA® 17352, SMA® 1000, SMA® 2000, Sartomer company, Inc.). Polymers of the present invention are further exemplified by those disclosed in U.S. Pat. No. 6,866,379.

The polymer of the present invention is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B, and C blocks is chosen to be the hydrophilic monomer and the remaining blocks are hydrophobic blocks dissimilar from one another. Preferably the copolymer is a random copolymer due to the ease of synthesis of such polymers.

The water-soluble polymer employed in this invention can be prepared by emulsion polymerization, solution polymerization, or bulk polymerization techniques well known in the art. Furthermore, the polymer has a weight average molecular weight of from 2,000 to 100,000, desirably from 4,000 to 40,000 and in one particular embodiment from 5,000 to 30,000.

The water-soluble polymer used in the invention is present in the inkjet ink generally from 0.1% to 2%, desirably from 0.1% to 1%, and in one particularly useful embodiment from 0.1% to 0.5% by weight based on the total weight of the ink. If the polymer concentration is above 2% by weight in the ink, the density of the printed image can be reduced. If the polymer concentration is below 0.1% the ejection firing performance of the ink can be compromised.

The amount of acid equivalents in the water-soluble polymer of the present invention can be represented as the equivalents of total acid per gram of polymer. An equivalent of acid is equal to the number of moles of the acid that supplies one mole of hydrogen ions. The number of equivalents of an acid compound is determined according to: moles of the acid compound*number of carboxylic acid groups. For mono carboxylic acids the number of carboxylic acids is equal to 1 and for dicarboxylic acids the number of acid groups is equal to 2.

The total equivalents of acid per gram of polymer can be estimated according to:

$$= \sum_{i=1}^{n} \frac{(\text{moles of acid } monomer_i) * (\text{\# of carboxylic acid groups in } monomer_i)}{(\text{total weight of all monomers in one gram of polymer})}$$

Alternatively, the equivalents of acid per gram of polymer can be obtained by potentiometric titration of a known amount of polymer using a suitable base, such as, for example a dilute solution of sodium hydroxide. The amount of base used to fully titrate all of the carboxylate groups on the water-soluble polymer can then be used to calculate the equivalents of acid per gram of polymer.

Inks of the present invention contain at least an organic base having a pKa>7.5. The term "pKa" used herein is defined as the negative logarithm of the acid dissociation constant (Ka) of the conjugate acid of the organic base. The acid dissociation constant, Ka, is defined as $[H^+][B]/[BH^+]$, wherein $[BH^+]$ denotes the concentration of undissociated conjugate acid, $BH^+$, in a solution and, $[H^+]$ and $[B]$ denote the concentrations of dissociated hydrogen ion, $H^+$, and organic base, B, thereof in the solution. Consequently, the value of pKa can be obtained from the equation: $pKa=-\log[H^+]-\log([B]/[BH^+])=pH-\log([B]/[BH^+])$. Literature values for the pKa of organic bases useful in the present invention can be found in, for example, "Dissociation of Organic Bases in Aqueous Solution," by D. D. Perrin, Butterworths, London, 1965. Alternatively, the pKa of the organic base can be determined by potentiometric titration according to the procedures outlined in, for example, "Protonation Constants of Mono-, Di-, and Triethanonolamine., Influence of the Ionic Composition of the Medium," by Juan Antelo, et. al., Journal of Chemical Engineering Data, vol. 29, 1992. The value of the pKa of the organic bases used herein is the pKa of the protonated base at 25° C. in aqueous solution, free of any added electrolytes.

Any suitable organic base having a pKa>7.5 can be used in the ink compositions of the present invention to improve the firing performance of the self-dispersing pigment ink. Typically, the pKa of the organic base is less than 10.5, desirably less than 10.0, and in one useful embodiment less than 9.5. The pKa of the base is desirably selected such that it is within the operating pH of the ink composition. Useful operating pH values for the ink compositions are from 6.0 to 10.0, desirably from 7.0 to 9.0 and in one useful embodiment, from 7.0 to 8.5. Organic bases useful in the present invention and having a pKa>7.5 include, but are not limited to; primary amines, for example, 2-amino-2-hydroxymethyl-1,3-propanediol, 2-amino-1,3 dihydroxy-2-ethyl propane, tris(hydroxymethyl)aminomethane, and 2-amino isopropanol, secondary amines, for example, diethanol amine and diisopropanol amine, and tertiary amines, for example, triethanolamine, triisopropanolamine, methyl diethanolamine, N,N-dimethyl ethanolamine, diethyl ethanolamine, dibutyl ethanolamine, dihydroxyisopropyl ethanolamine, dihydroxyisopropyl ethylamine, dihydroxyisopropyl isopropylamine, dihydroxyisopropyl t-butylamine, dihydroxyisopropyl butylamine, dimethyl isopropanolamine, diethyl isopropanolamine, diisopropyl isopropanolamine, and dibutyl isopropanolamine.

The organic base useful in the present invention having a pKa>7.5 can also be an amino acid selected from bicine, tricine, and N,N-bis(2-hydroxyethyl)glycine, a sulfonic acid buffer such as, 4-(2-hydroxyethyl)-1-piperazine propane sulfonic acid, 2-(N-cylcohexylamino)ethane propane sulfonic acid, N-cyclohexyl-3-aminopropane sulfonic acid, or N-tris(hydroxymethyl)-2-aminopropane sulfonic acid. Alternatively, the organic base can be a metal salt of a carbonate or bicarbonate such as, for example, sodium or potassium carbonate or bicarbonate. The alkaline equivalents of organic base are defined as the number of moles of organic base present in the ink composition.

Ink compositions of the present invention may optionally contain an inorganic base. Typical inorganic bases useful in the present invention include, for example, sodium hydroxide, potassium hydroxide, lithium hydroxide, and rubidium hydroxide. The inorganic base may be used to deprotonate the carboxylic acid groups on the polymer thereby rendering the polymer water-soluble. Alternatively, the inorganic base can be added to the ink composition as a separate addenda during the ink manufacturing step. The alkaline equivalents of inorganic base are defined as the number of moles of inorganic base present in the ink composition.

When inorganic base is present in the ink composition a restraint is imposed such that the amount of organic base having a pKa>7.5 is in excess of the inorganic base. Typically, the ratio of organic base to inorganic base is greater than 1:1, desirably greater than 1.5:1 and in one particularly useful embodiment greater than 2:1. If desired, additional acidic components can be present in the ink composition and a suitable amount of excess alkaline equivalents of base can be present to neutralize these acidic species.

The organic base having a pKa>7.5 and optional inorganic base are present in the ink composition in combined amounts such that the total alkaline equivalents of base are greater than 150% of the acid equivalents of the water-soluble polymer, desirably greater than 175% and in one particularly useful embodiment greater than 200%. The amount of base required for inks of the present invention therefore depends on both the amount of water-soluble polymer present in the ink composition, as well as the amount of acid groups on the polymer. If the amount of total alkaline equivalents of base is less than 150% of the acid equivalents of the water-soluble polymer the ink composition can lead to fouling of the inkjet printhead nozzles. If there is insufficient amount of organic base to inorganic base, the printhead nozzles can also be fouled due to degraded jetting or from accumulation of nodules. It should be noted that these problems can be worsened when the ink composition has been held for a period of time at elevated temperatures or an extended period of time at ambient conditions.

Surfactants may be added to adjust the surface tension of the ink to an appropriate level. The surfactants may be anionic, cationic, amphoteric, or nonionic and used at levels of 0.01 to 5% of the ink composition. Examples of suitable nonionic surfactants include, linear or secondary alcohol ethoxylates (such as the TERGITOL™ 15-S and TERGITOL™ TMN series available from Union Carbide and the BRIJ® series from Uniquema), ethoxylated alkyl phenols (such as the TRITON™ series from Union Carbide), fluoro surfactants (such as the ZONYLS® from DuPont; and the FLUORADS™ from 3M), fatty acid ethoxylates, fatty amide ethoxylates, ethoxylated and propoxylated block copolymers (such as the PLURONIC® and TETRONIC® series from BASF, ethoxylated and propoxylated silicone based surfactants (such as the SILWET™ series from CK Witco), alkyl polyglycosides (such as the GLUCOPONS® from Cognis) and acetylenic polyethylene oxide surfactants (such as the SURFYNOLS® from Air Products and Chemicals, Inc.).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX™ series from Dexter Chemical L.L.C.), phosphonated and amine oxide surfactants and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents," 1995, North American Editor."

Jet velocity, separation length of the droplets, drop size, and stream stability are greatly affected by the surface tension and the viscosity of the ink. The inkjet inks suitable for use with inkjet printing systems and to apply to non-absorbing substrates, especially high surface energy hydrophobic surfaces, should have a surface tension in the range of about 20 dynes/cm to about 60 dynes/cm and, more preferably, in the range 20 dynes/cm to about 50 dynes/cm. Control of surface tensions in aqueous inks is accomplished by additions of small amounts of surfactants. The level of surfactants to be used can be determined through simple trial and error experiments, usually about 0.01% to about 6%, preferably 0.1% to about 2% by weight of the total ink composition. Anionic, cationic, and nonionic surfactants may be selected from those disclosed in U.S. Pat. Nos. 5,324,349; 4,156,616; and 5,279,654, as well as many other surfactants known in the inkjet ink art. Commercial surfactants include the SURFYNOLS® from Air Products and Chemicals, Inc.; the ZONYLS® from DuPont, and the FLUORADS™ from 3M.

The ink preferably has physical properties compatible with a wide range of ejecting conditions, i.e., driving voltages and pulse widths for thermal inkjet printing devices, driving frequencies of the piezo element for either a drop-on-demand device or a continuous device, and the shape and size of the nozzle. The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are typically no greater than 0.02 Ns/m$^2$, and preferably in the range of about 0.01 Ns/m$^2$ to 0.06 Ns/m$^2$ and most preferably in the range of 0.015 Ns/m$^2$ and 0.03 Ns/m$^2$. The inkjet inks useful in the invention typically exhibit a solution density of between 1 and 1.2 g/cc.

A biocide (0.01-1.0% by weight) may also be added to prevent unwanted microbial growth which may occur in the ink over time. A preferred biocide for the inks employed in the present invention is PROXEL™ GXL (Arch UK Biocides, Ltd.) at a concentration of 0.05-0.1% by weight or/and KORDEK™ (Rohm and Haas Co.) at a concentration of 0.05-0.1% by weight (based on 100% active ingredient. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

Ink compositions useful in the invention may include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include: (1) alcohols such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols, and thioglycol; (3) lower mono- and di-alkyl ethers derived from the polyhydric alcohols such as, ethylene glycol monomethyl ether, ethylene glycol monobutyl ether, ethylene glycol monoethyl ether acetate, diethylene glycol monomethyl ether, diethylene glycol monobutyl ether, polyethylene glycol monobutyl ether, and diethylene glycol monobutyl ether acetate; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanot, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

The invention is summarized above. Inkjet printing systems useful in the invention comprise a printer, at least one ink, and an image recording element, typically a sheet (herein also "media"), suitable for receiving ink from an inkjet printer. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation, or an actuator that is made to move.

Drop-on-demand (DOD) liquid emission devices have been known as ink printing devices in inkjet printing systems for many years. Early devices were based on piezoelectric actuators such as are disclosed in U.S. Pat. Nos. 3,946,398 and 3,747,120. A currently popular form of inkjet printing, thermal inkjet (or "thermal bubble jet"), uses electrically resistive heaters to generate vapor bubbles which cause drop emission, as is discussed in U.S. Pat. No. 4,296,421. In another process, known as continuous inkjet, a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; and 6,517,197.

FIG. 1 shows one schematic example of an inkjet printer 10 that includes a protective cover 40 for the internal components of the printer. The printer contains a media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording medium supply 20 in a media supply tray to a region where the printhead 30 deposits droplets of ink onto the media sheet. The printed media collection 22 is accumulated in an output tray.

Figure 2:
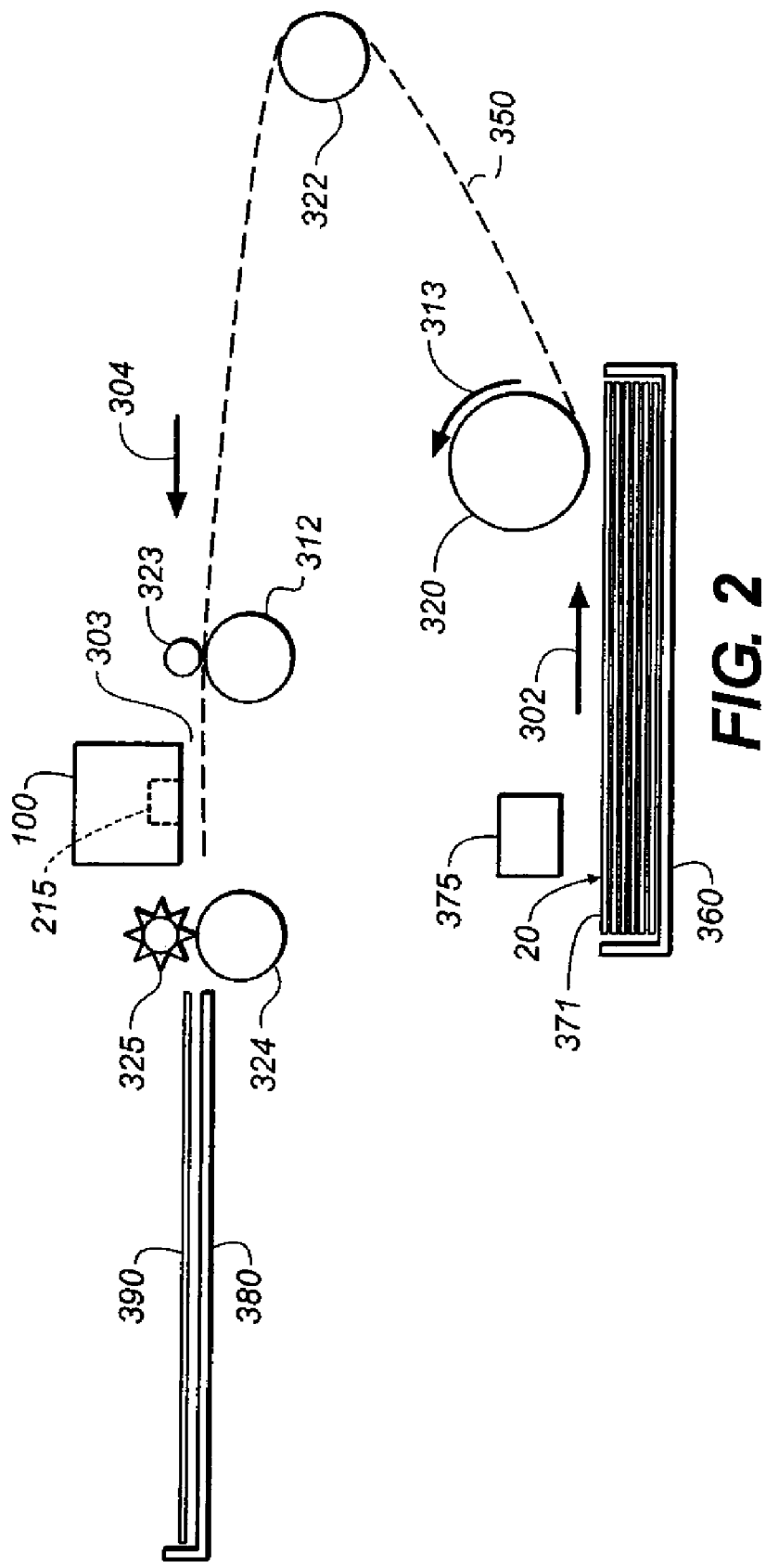
FIG. 2 is a schematic diagram showing the flow of recording element or media from the supply tray to the collection tray.

FIG. 2 shows schematically how the inkjet printer comprises a variety of rollers to advance the media sheet, for example paper, through the printer, as shown schematically in the side view of FIG. 2. In this example, a pickup roller 320 moves the top media sheet 371 of a recording medium supply 20 that is located in a media supply tray 360 in the direction of arrow 302. A turn roller 322 acts to move the media sheet 371 around a C-shaped path 350 (in cooperation with a curved surface-not shown) so that the media sheet continues to advance along direction arrow 304 in the printer. The media sheet 371 is then moved by feed roller 312 and idler roller(s) 323 to advance along direction 304 across the print region 303 and under printer carriage 100. A discharge roller 324 and star wheel(s) 325 transport the printed media sheet 390 along direction 304 and to an output tray 380. For normal media pick-up and feeding, it is desired that all driven rollers rotate in forward direction 313. An optional sensor 215 capable of detecting properties of the media sheet or indicia contained thereon can be mounted on the carriage 100. A further optional sensor 375 capable of detecting properties of the media sheet or indicia contained thereon may be positioned facing the front or back surface of the media sheet 371 and located at any advantageous position along the media transport path 350 including the media supply tray 360. Alternatively, the inkjet printing system comprises a printer supplied with a continuous roll of ink recording medium that may be cut to individual prints subsequent to printing.

Different types of image-recording elements (media) vary widely in their ability to absorb ink. Inkjet printing systems provide a number of different print modes designed for specific media types. A print mode is a set of rules for determining the amount, placement, and timing of the jetting of ink droplets during the printing operation. For optimal image reproduction in inkjet printing, the printing system must match the supplied media type with the correct print mode. The printing system may rely on the user interface to receive the identity of the supplied media, or an automated media detection system may be employed. A media detection system comprises a media detector, signal conditioning procedures, and an algorithm or look-up table to decide the media identity. The media detector may be configured to sense indicia present on the media comprising logos, patterns, and the like corresponding to media type, or may be configured to detect inherent media properties, typically optical reflection. The media detector may be located in a position to view either the front or back of the media sheet, depending on the property being detected. As exemplified in FIG. 2, the media detector 375 may be located to view the media sheet 371 in the media supply tray 360 or along the media transport path 350. Alternatively, optical sensor 215 may be located at the print region 303. Usefully, the media comprise a repeating pattern detectable by the method described in U.S. Pat. No. 7,120,272. Alternatively, a number of media detection methods are described in U.S. Pat. No. 6,585,341.

Embodiments of the inkjet recording ink of the invention may provide, among other attributes, improved color density, gloss, ink capacity, image permanence, adhesion to the support or underlying layers, and water-fastness. In addition, the ink may provide improved resistance to banding, differential gloss, coalescence, bleed, fade due to light, heat, or exposures to atmospheric gases, for example ozone, high humidity bleeding, abrasion resistance, and yellowing.

The following examples illustrate, but do not limit, the utility of the present invention.

EXAMPLES

Polymer Binder Preparation

Polymer P1

Mixed in a 1-liter, three-necked round-bottom flask equipped with a reflux condenser under nitrogen atmosphere was 78 g of benzyl methacrylate, 22 g of methacrylic acid, 4.6 g of 1-dodecanethiol, and 400 mL of methyl ethyl ketone. The solution was stirred and purged with nitrogen for 20 minutes and heated to 70° C. in a constant temperature bath; 1.5 g. of azo(bis)isobutyronitrile (AIBN) was added. After 24 hours, the resulting solution was cooled. The resulting polymer solution was mixed with water and potassium hydroxide to achieve 85% acid neutralization. Thereafter the whole mixture was distilled at 50° C. under reduced pressure to remove the organic solvent. The final water-soluble polymer solution had a concentration of ca. 20 wt. % in water and its pH was ca. 8.5. The number average molecular weight was 4320 daltons, the weight average molecular weight was 7160 daltons, and the calculated acid number was 146.

Polymer P2

P2 was prepared similarly to P1 except that 67 g of benzyl methacrylate, 33.0 g of methacrylic acid, 1.7 g of AIBN and 4.5 g of 1-dodecanethiol were used. The number average molecular weight was 5040 daltons, the weight average molecular weight was 8860 daltons, and the acid number was 215. The final polymer was 85% neutralized by potassium hydroxide to provide a water-soluble polymer at a concentration of ca. 20 wt. % in water.

Polymer P3

P3 was a commercial polymer product SMA® 1732P purchased from the Sartomer Company, Inc. in powder form. It is a partial monoester of styrene maleic anhydride and a mixture of two alcohols. After dispersal in water, the polymer solution was 85% neutralized with potassium hydroxide. The number average molecular weight was 2800 daltons, and the acid number was 270 daltons.

Example A

Preparation of black inks from self-dispersed carbon black dispersions of various volatile surface functional groups.

Ink Formulation

Comparative Ink A1

To prepare the Ink A1, 34.6g of self-dispersed carbon black dispersion BONJET® CW-3 from Orient Corporation of America (13 wt % active), 5 g of diethylene glycol, 8 g of glycerol, 3g of polyethylene glycol 400 (Dow Chemical Co.), 7.5 g of STRODEX™ PK-90 surfactant solution from Dexter Chemical L.L.C. (diluted to 2% wt), and 2.0 g of water soluble polymer P2 solution (20% active) were added together with distilled water so that the final weight of the ink was 100.0 g. The final ink contained 4.5% carbon 5% diethylene glycol, 8% glycerol, 3% polyethylene glycol 400, 0.15% STRODEX™ PK-90 and 0.4% water-soluble polymeric binder. The solution was filtered through a 1.2 μm polytetrafluoroethylene filter. The resulting ink had the following physical properties: a surface tension of 33 dynes/cm at room temperature, a viscosity of 0.018 Ns/m$^2$ at room temperature, and a pH of 7.6. The ink contained 0.0023 mmol of untitrated polymer acid per gram of ink and no additional organic base. The 50% and 95% particle sizes of the ink were about 96 nm and 190 nm as measured by MICROTRAC II Ultrafine particle analyzer (UPA) manufactured by Leeds & Northrup.

Comparative Ink A2

Ink A2 was prepared similarly to Ink A1 except that 22.5 of self-dispersed carbon black dispersion AQUA-BLACK® 162 from Tokai Carbon Co., Ltd. (20 wt % active) was added in place of BONJET® CW-3. The final ink contained 4.5% carbon 5% diethylene glycol, 8% glycerol, 3% polyethylene glycol 400, 0.15% STRODEX™ PK-90 and 0.4% water-soluble polymeric binder P2. The solution was filtered through a 1.2 μm polytetrafluoroethylene filter. The resulting ink had the following physical properties: a surface tension of 34 dynes/cm at room temperature, a viscosity of 0.018 Ns/m$^2$ at room temperature, and a pH of 7.4. The ink contained 0.0023 mmol of untitrated polymer acid per gram of ink and no additional organic base. The 50% and 95% particle sizes of the ink were about 130 nm and 194 nm as measured by MICROTRAC II Ultrafine particle analyzer (UPA) manufactured by Leeds & Northrup.

Comparative Ink A3

Ink A3 was prepared similarly to Ink A1 except that 22.5 of self-dispersed carbon black dispersion AQUA-BLACK® 164 from Tokai Carbon Co., Ltd. (20 wt % active) was added in place of BONJET® CW-3. The final ink contained 4.5% carbon, 5% diethylene glycol, 8% glycerol, 3% polyethylene glycol 400, 0.15% STRODEX™ PK-90, and 0.4% water-soluble polymeric binder P2. The solution was filtered through a 1.2 μm polytetrafluoroethylene filter. The resulting ink had the following physical properties: a surface tension of 33.4 dynes/cm at room temperature, a viscosity of 0.018 Ns/m$^2$ at room temperature, and a pH of 7.4. The ink contained 0.0023 mmol of untitrated polymer acid per gram of ink and no additional organic base. The 50% and 95% particle sizes of the ink were about 147 nm and 222 nm as measured by MICROTRAC II Ultrafine particle analyzer (UPA) manufactured by Leeds & Northrup.

Comparative Ink A4

Ink A4 was prepared similarly to Ink A1 except that 30 g of self-dispersed carbon black CAB-O-JET® 300 from Cabot Corp (15 wt % active) was added in place of BONJET®

CW-3. The final ink contained 4.5% carbon 5% diethylene glycol, 8% glycerol, 3% polyethylene glycol 400, 0.15% STRODEX™ PK-90 and 0.4% water soluble polymeric binder P2. The solution was filtered through a 1.2 μm polytetrafluoroethylene filter. The resulting ink had the following physical properties: a surface tension of 30 dynes/cm at room temperature, a viscosity of 0.0184 Ns/m² at room temperature, and a pH of 8.2. The ink contained 0.0023 mmol of untitrated polymer acid per gram of ink and no additional organic base. The 50% and 95% particle sizes of the ink were about 125 nm and 186 nm as measured by MICROTRAC II Ultrafine particle analyzer (UPA) manufactured by Leeds & Northrup.

Comparative Ink A5

Ink A5 was prepared similarly to Ink A1 except that 30 g of a self-dispersed carbon black D1 from Cabot Corp. (15 wt % active) was added in place of BONJET® CW-3. D1 is very similar to CAB-O-JET® 300, except that the amount of surface functional group has been increased due to higher treatment level. The final ink contained 4.5% carbon, 5% diethylene glycol, 8% glycerol, 3% polyethylene glycol 400, 0.15% STRODEX™ PK-90 and 0.4% water-soluble polymeric binder P2. The solution was filtered through a 1.2 μm polytetrafluoroethylene filter. The resulting ink had the following physical properties: a surface tension of 30 dynes/cm at room temperature, a viscosity of 0.0184 Ns/m² at room temperature, and a pH of 8.2. The ink contained 0.0023 mmol of untitrated polymer acid per gram of ink and no additional organic base. The 50% and 95% particle sizes of the ink were about 125 nm and 186 nm as measured by MICROTRAC II Ultrafine particle analyzer (UPA) manufactured by Leeds & Northrup.

Plain Paper Performance Evaluation Inks A1-A5 were filled into printer compatible empty cartridges and printing was done with a Canon i960 thermal inkjet printer. A solid area of 1 inch by 1 inch at 100% dot coverage was printed at 2 pass, bi-directional mode on 6 plain papers. The Status A reflection densities of the printed patches of all the 6 papers were measured using a sectoring densitometer. Since the print density is very paper sensitive and the objective was to achieve the lowest paper to paper variability, three parameters were chosen to evaluate print quality attributes, especially paper to paper variability, for each ink under evaluation. They were: 1) Average print density across 6 papers; 2) Print density range (Maximum print density-minimum print density) among the 6 papers; and 3) minimum print density on the worst performing paper. They are listed in Table 1. The 6 papers used for evaluation were: 1) Georgia-Pacific inkjet Paper Catalog Number 214305N; 2) Kodak bright white inkjet paper; 3) Hewlett Packard Color inkjet paper; 4) Georgia-Pacific multipurpose Catalog Number 214306; 5) Hammermill Copy Plus; and 6) Hewlett Packard Multipurpose paper.

Inks A1-A5 were filled into printer compatible empty text black cartridges and printed with a Kodak 5300 thermal inkjet printer. After priming, a nozzle check target was printed to establish that all nozzles of all colors were firing properly. Then five fill 8.5" by 11" pages were uniformly printed using just the text black channel at an ink laydown that represented 70% of the maximum laydown. The head was then promptly removed and placed open in a tray under ambient conditions of 73° C. and 50% relative humidity. After 72 hours, the front surface of the printheads were examined under magnification with a microscope.

TABLE 1

CARBON BLACK DISPERSION FUNCTIONAL GROUPS PROPERTIES AND PRINT QUALITY FOR INKS IN EXAMPLE A (NO ORGANIC BASE PRESENT)

| | carbon black dispersion properties | | | | | |
|---|---|---|---|---|---|---|
| | wt % volatile | wt % volatile | print quality | | | |
| ink/type | surface functional group | lactonic functional group | average print density | density range | minimal density | nodules formed? |
| A1/C | 14.6 | 8.0 | 1.33 | .25 | 1.2 | yes |
| A2/C | 20.4 | 9.2 | 1.40 | 0.14 | 1.33 | yes |
| A3/C | 23.4 | 11.3 | 1.49 | 0.15 | 1.43 | yes |
| A4/C | 5.0 | 2.7 | 1.26 | 0.49 | 1.01 | yes |
| A5/C | 8.7 | 3.6 | 1.31 | 0.60 | 1.07 | yes |

The above results showed that carbon black pigment having a total wt % volatile surface functional group greater than 11% is an important parameter of the carbon black dispersion properties in order to achieve excellent plain paper text quality. Desirable carbon black pigments having greater than 5% volatile lactonic functional groups as measured above show print density paper to paper variability that was dramatically reduced. All five comparative inks were observed to have unacceptable deposited polymer nodules onto the internal ejector surfaces, as there was no additional organic base added to the inks.

Example B

Black inks made from >11% surface functional groups self-dispersed carbon black do not show reduced density upon the addition of water soluble polymer.

Comparative Ink B1a

To prepare the Ink B1, 34.6 g of self-dispersed carbon black dispersion BONJET® CW-3 from Orient Corporation of America (13 wt % active), 5 g of diethylene glycol, 8 g of glycerol, 3 g of polyethylene glycol 400 (Dow Chemical Company), 6.0 g of STRODEX™ PK-90 surfactant from Dexter Chemical L.L.C. (diluted to 2% wt), and 2.0 g of water soluble polymer P1 (20% active) were added together with distilled water so that the final weight of the ink was 100.0 g. The final ink contained 4.5% carbon 5% diethylene glycol, 8% glycerol, 3% polyethylene glycol 400, 0.12% STRODEX™ PK-90 and 0.4% water-soluble polymeric binder. The solution was filtered through a 1.2 μm polytetrafluoroethylene filter. The ink contained 0.0016 mmol of untitrated polymer acid per gram of ink and no additional organic base.

Comparative Ink B1b

Ink B1b was prepared similarly to Ink B1a except that none of the water-soluble polymer was added.

Comparative Ink B2a

To prepare the Ink B2a, 22.5 g of self-dispersed carbon black dispersion AQUA-BLACK® 162 from Tokai Carbon Co., Ltd. (20 wt % active), 5 g of diethylene glycol, 8 g of glycerol, 3 g of polyethylene glycol 400 (Dow Chemical Company), 5.0 g of STRODEX™ PK-90 surfactant from Dexter Chemical L.L.C. (diluted to 2% wt), and 2.5 g of water soluble polymer P2 (20% active) were added together with distilled water so that the final weight of the ink was 100.0 g. The final ink contained 4.5% carbon 5% diethylene glycol, 8% glycerol, 3% polyethylene glycol 400, 0.1% STRODEX™ PK-90 and 0.5% water-soluble polymeric binder. The solution was filtered through a 1.2 μm polytetrafluoroethylene filter. The ink contained 0.0029 mmol of untitrated polymer acid per gram of ink and no additional organic base.

Comparative Ink B2b

Ink B2b was prepared similarly to Ink B2a except that none of the water-soluble polymer was added.

Comparative Ink B3a

To prepare the Ink B3a, 22.5 g of 26.7 g of self-dispersed carbon black CAB-O-JET® 300 from Cabot Corp. (15 wt % active), 5 g of diethylene glycol, 10 g of glycerol, 10 g of STRODEX™ PK-90 surfactant from Dexter Chemical L.L.C. diluted to 2% wt), and 6 g of water soluble polymer P2 (20% active) were added together with distilled water so that the final weight of the ink was 100.0 g. The final ink contained 4.0% carbon 5% diethylene glycol, 10% glycerol, 0.2% STRODEX™ PK-90 and 1.2% water soluble polymeric binder. The solution was filtered through a 1.2 μm polytetrafluoroethylene filter. The ink contained 0.0069 mmol of untitrated polymer acid per gram of ink and no additional organic base.

Comparative Ink B3b

Ink B3b was prepared similarly to Ink B3a except that none of the water-soluble polymer was added.

Plain Paper Density Retaining Power Evaluation

Inks of Example B were filled into printer compatible empty cartridges and printing was done with a Canon i960 thermal inkjet printer. A solid area of 1 inch by 1 inch at 100% dot coverage was printed at 2 pass, bi-directional mode on 6 plain papers. The Status A reflection densities of the printed patches of all the 6 papers were measured using a sectoring densitometer. Since the print density is paper sensitive, two parameters were chosen to evaluate print quality attributes of each ink paper combination. They were: 1) Average print density across 6 papers; and 2) Print density range (Maximum print density-minimum print density) among the 6 papers. The Plain Paper Density Retaining Power is then defined as the difference between the average print qualities for inks made with and without the selected possible density reduction agent in the ink. In this case, the (Ink a) is the ink with polymer and (Ink b) is the ink without polymer. The specific parameters used to characterize the Plain Paper Density Retaining Power is: 1) Difference of the average print density difference over 6 papers for (Ink b) minus that for (Ink a); and 2) Difference of the print density range over 6 papers for (Ink b) minus that of (Ink a). They are listed in Table 2. The 6 papers used were the same as that in Example A.

All six inks of Example B were filled into printer compatible empty text black cartridges and printed with a Kodak 5300 thermal inkjet printer. After priming, a nozzle check target was printed to establish that all nozzles of all colors were firing properly. Then five full 8.5" by 1" pages were uniformly printed using just the text black channel at an ink laydown that represented 70% of the maximum laydown. The head was then promptly removed and placed open in a tray at ambient conditions of 73 degrees Celsius and 50% relative humidity. After 72 hours, the front surface of the printheads were examined under magnification with a microscope.

TABLE 2

DISPERSION FUNCTIONAL GROUP PROPERTIES AND PLAIN PAPER DENSITY RETAINING POWER FOR INKS IN EXAMPLE B (NO ORGANIC BASE PRESENT)

| Ink/Type | | carbon black dispersion properties | | plain paper density retaining power | | | | |
|---|---|---|---|---|---|---|---|---|
| | | wt % volatile surface functional group | wt % volatile lactonic functional group | plain paper density | | difference in average | difference in density | |
| | | | | average print density | density range | density ink a vs ink b | range ink a vs ink b | nodules formed? |
| Ink Set B1/C | B1a | 14.6 | 8.0 | 1.32 | 0.26 | 0.0 | 0.0 | yes |
| | B1b | | | 1.32 | 0.26 | | | no |
| Ink Set B2/C | B2a | 20.4 | 9.2 | 1.37 | 0.17 | 0.0 | −0.01 | yes |
| | B2b | | | 1.37 | 0.16 | | | no |
| Ink Set B3/C | B3a | 5.0 | 2.7 | 1.14 | 0.52 | 0.14 | −0.15 | yes |
| | B3b | | | 1.28 | 0.37 | | | no |

The above results showed that carbon black pigment having a total wt % volatile surface functional group greater than 11% is an important parameter of the carbon black dispersion properties in order to increase the plain paper density retaining power. Desirable carbon black pigments having greater than 5% volatile lactonic functional groups as measured above showed much more density retaining power and thus less plain paper density reduction when selected density reducing components, e.g. water soluble polymer, was added into the ink. This greatly increased the ink formulation parameter space and latitude, especially under conditions when these components were required for overall ink performance, such as jetting performance and print durability. All three comparative inks containing polymer were observed to have unacceptable deposited polymer nodules onto the internal ejector surfaces, as there was no additional organic base added to the inks.

Example C

Water-soluble polymer is needed for reliable printing on the printer.

Comparative Ink C1

To prepare the Ink C1, 22.5g of self-dispersed carbon black dispersion AQUABLACK® 162 from Tokai Carbon Corp., Ltd. (20 wt % active), 5 g of diethylene glycol, 8 g of glycerol, 3 g of polyethylene glycol 400 (Dow Chemical Company), 2.5 g of TERGITOL™ 15-s-12 surfactant from Dow Chemical Company (diluted to 10% wt), and 2.0 g of water soluble polymer P1 (20% active) were added together with distilled water so that the final weight of the ink was 100.0 g. The final ink contained 4.5% carbon 5% diethylene glycol, 8% glycerol, 3% polyethylene glycol 400, 0.25% TERGITOL™ 15-s-12 and 0.4% water soluble polyneric binder. The solution was filtered through a 1.2 μm polytetrafluoroethylene filter. The ink contained 0.0016 mmol of untitrated polymer acid per gram of ink and no additional organic base.

Comparative Ink C2

To prepare the Ink C2, 22.5g of self-dispersed carbon black dispersion AQUA-BLACK® 162 from Tokai Carbon Co., Ltd.(20 wt % active), 5 g of dietbylene glycol, 8 g of glycerol, 3g of polyethylene glycol 400 (Dow Chemical Company), 6 g of STRODEX™ PK-90 (diluted to 2%), and 2.5 g of water soluble polymer P2 (20% active) were added together with distilled water so that the final weight of the ink was 100.0 g. The final ink contained 4.5% carbon 5% diethylene glycol, 8% glycerol, 3% polyethylene glycol 400, 0.12% STRODEX™ PK-90 and 0.5% water-soluble polymeric binder P2. The ink contained 0.0029 mmol of untitrated polymer acid per gram of ink and no additional organic base.

Comparative Ink C3

To prepare the Ink C3, 34.6g of self-dispersed carbon black dispersion CW-3 from Orient Corporation of America (13% active), 5 g of diethylene glycol, 8 g of glycerol, 3g of polyethylene glycol 400 (Dow Chemical Company), 4 g of TERGITOL™ 15-s-12 surfactant from Dow Chemical Company (diluted to 10% wt), and 2.0 g of water soluble polymer P1 (20% active) were added together with distilled water so that the final weight of the ink was 100.0 g. The final ink contained 4.5% carbon 5% diethylene glycol, 8% glycerol, 3% polyethylene glycol 400, 0.4% TERGITOL™ 15-s-12 and 0.4% water soluble polymeric binder P1. The ink contained 0.0016 mmol of untitrated polymer acid per gram of ink and no additional organic base.

Comparative Ink C4

Comparative Ink C4 was prepared similarly to Ink C2, except that none of the water-soluble polymer was added.

Comparative Ink C5

Comparative Ink C5 was prepared similarly to Ink C3, except that none of the water-soluble polymer was added.

System Text Printing Evaluation

Inks of Example C were filled into printer compatible empty cartridges and printing was done using an experimental thermal desktop printer. The testing system prints a text document of 5% coverage to simulate typical consumer text printing. For every 40 pages of continuous printing, a nozzle check target was printed to evaluate nozzle health. The number of missing nozzles at each interval was recorded. Two parameters were used to evaluate the system printing performance: 1) Average number of nozzles missing after 600 pages of printing; and 2) Number of pages printed before 20% of the nozzles failed to fire properly. The results are listed in Table 4.

All five inks of Example C were filled into printer compatible empty text black cartridges and printed with a Kodak 5300 thermal inkjet printer. After priming, a nozzle check target was printed to establish that all nozzles of all colors were firing properly. Then five full 8.5" by 11" pages were uniformly printed using just the text black channel at an ink laydown that represented 70% of the maximum laydown. The head was then promptly removed and placed open in a tray at ambient conditions of 73° C. and 50% relative humidity. After 72 hours, the front surfaces of the printheads were examined under magnification with a microscope.

TABLE 3

SYSTEM TEXT PRINTING FOR INKS IN EXAMPLE C

| | test printing performance | | |
|---|---|---|---|
| Ink/Type | average no of nozzles missing after 600 pages | no.of pages printed before 20% nozzles missing | nodules formed? |
| C1/C | 2.6 | >600 pages | yes |
| C2/C | 1.7 | >600 pages | yes |
| C3/C | 2.0 | >600 pages | yes |
| C4/C | 87 | 120 pages | no |
| C5/C | 44 | 160 pages | no |

The above results show that the black inks containing a self-dispersed carbon black with >11% surface functional groups and a water soluble polymer had significantly improved text printing in a printer system. Without the polymer, printing performance was significantly degraded. All three inks containing polymer were observed to have deposited polymer nodules onto the internal ejector surfaces, as there was no additional organic base in these inks.

The data shown in Tables 1, 2, and 3 shows that the absence of water-soluble polymers in inks containing self-dispersing pigments results in no polymer nodule formation. However, inks without water-soluble polymer show degraded jetting performance. Inks containing water-soluble polymer and self-dispersing pigments show improved jetting performance, but show unacceptable polymer nodule deposition on the surface of the nozzles in the absence of organic base in the ink.

Example D

Black inks made from >11% surface functional groups self-dispersed carbon black and water soluble polymer are improved against nodule formation with the addition of base equivalents that exceed the polymer acid equivalents by 150% where the equivalents of an organic base present in the ink are greater than or equal to the equivalents of any inorganic base.

Comparative Ink D1

To prepare the Ink D1, 86.5g of self-dispersed carbon black dispersion CW-3 from Orient Corporation of America (13% active), 10 g of diethylene glycol, 20 g of glycerol, 10 g of 1,5-pentanediol, 10 g of TERGITOL™ 15-S-12 surfactant from Dow Chemical Company (diluted to 10% wt), and 4.03 g of water soluble polymer P2 (24.8% active) were added together with distilled water so that the final weight of the ink was 250.0 g. The final ink contained 4.5% carbon, 4% diethylene glycol, 8% glycerol, 4% 1,5-pentanediol, 0.4% TERGITOL™ 15-S-12 and 0.4% water soluble polymeric binder P2.

Comparative Ink D2

Ink D2 was prepared similarly to Ink D1 except 0.63 g of triethanolamine base (20% active) was added. The final ink contained 4.5% carbon, 4% diethylene glycol, 8% glycerol, 4% 1,5-pentanediol, 0.4% TERGITOL™ 15-S-12, 0.4% water soluble polymeric binder P2, and 0.05% triethanolamine (pKa=7.8).

Comparative Ink D3

Ink D3 was prepared similarly to Ink D1 except 1.25 g of triethanolamine base (20% active) was added. The final ink contained 4.5% carbon, 4% diethylene glycol, 8% glycerol, 4% 1,5-pentanediol, 0.4% TERGITOL™ 15-S-12, 0.4% water soluble polymeric binder P2, and 0.1% triethanolamine (pKa=7.8).

Inventive Ink D4
    Ink D4 was prepared similarly to Ink D1 except 2.5 g of triethanolamine base (20% active) was added. The final ink contained 4.5% carbon, 4% diethylene glycol, 8% glycerol, 4% 1,5-pentanediol, 0.4% TERGITOL™ 15-S-12, 0.4% water soluble polymeric binder P2, and 0.2% triethanolamine.
Inventive Ink D5
    Ink D5 was prepared similarly to Ink D1 except 5.0 g of triethanolamine base (20% active) was added. The final ink contained 4.5% carbon, 4% diethylene glycol, 8% glycerol, 4% 1,5-pentanediol, 0.4% TERGITOL™ 15-S-12, 0.4% water soluble polymeric binder P2, and 0.4% triethanolamine.
Comparative Ink D6
    Ink D6 was prepared similarly to Ink D4 except the water soluble polymer was excluded. The final ink contained 4.5% carbon, 4% diethylene glycol, 8% glycerol, 4% 1,5-pentanediol, 0.4% TERGITOL™ 15-S-12, and 0.2% triethanolamine.
Comparative Ink D7
    Ink D7 was prepared similarly to Ink D4 except 4.17 g of polymer P3 (24.0% active) was added in place of polymer P2. The final ink contained 4.5% carbon, 4% diethylene glycol, 8% glycerol, 4% 1,5-pentanediol, 0.4% TERGITOL™ 15-S-12, 0.4% water soluble polymeric binder P3, and 0.2% triethanolamine.
Comparative Ink D8
    Ink D8 was prepared similarly to Ink D1 except the water soluble polymer was excluded. The final ink contained 4.5% carbon, 4% diethylene glycol, 8% glycerol, 4% 1,5-pentanediol, and 0.4% TERGITOL™ 15-S-12.
Inventive Ink D9
    Ink D9 was prepared similarly to Ink D4 except 3.97 g of polymer P1 (25.2% active) was added in place of polymer P2. The final ink contained 4.5% carbon, 4% diethylene glycol, 8% glycerol, 4% 1,5-pentanediol, 0.4% TERGITOL™ 15-S-12, 0.4% water soluble polymeric binder P1, and 0.2% triethanolamine.
Comparative Ink D10
    Ink D10 was prepared similarly to Ink D9 except 11.9 g of polymer P1 (25.2% active) was added. The final ink contained 4.5% carbon, 4% diethylene glycol, 8% glycerol, 4% 1,5-pentanediol, 0.4% TERGITOL™ 15-S-12, 1.2% water soluble polymeric binder P1, and 0.2% triethanolamine.
Comparative Ink D11
    Ink 11 was prepared similarly to Ink D9 except 19.8 g of polymer P1 (25.2% active) was added. The final ink contained 4.5% carbon, 4% diethylene glycol, 8% glycerol, 4% 1,5-pentanediol, 0.4% TERGITOL™ 15-S-12, 2.0% water soluble polymeric binder P1, and 0.2% triethanolamine.

All fresh inks of Example D were filled into printer compatible empty text black cartridges and printed with a Kodak 5300 thermal inkjet printer. After priming, a nozzle check target was printed to establish that all nozzles of all colors were firing properly. Then five full 8.5" by 11" pages were uniformly printed using just the text black channel at an ink laydown that represented 70% of the maximum laydown. The head was then promptly removed and placed open in a tray at ambient conditions of 73 degrees Celsius and 50% relative humidity. After 72 hours, the front surface of the printheads were examined under magnification with a microscope. The above procedure was repeated on the inks after they had been incubated in an oven for I week at 85 degrees Celsius.

Inks were also evaluated on a drop performance fixture utilizing a commercial Kodak printhead. The operating voltage was held at 18 percent over the threshold voltage (minimum voltage needed to cause ejection of an ink droplet) of the printhead. The transit time for a drop of ink traveling 0.3 mm was recorded based on the signal captured by a laser detector. The drop velocity was then calculated based on this transit time. Under the above conditions, the inks were fired at 10 kHz from four separate nozzles for up to $2 \times 10^7$ firing events. All inks showed at least some change in velocity over the course of jetting, and the number of firings for the initial velocity to stabilize were recorded. In this case, a more rapid stabilization (fewer drops ejected) would be beneficial to printer performance.

TABLE 4

EQUIVALENTS OF ACID AND BASE IN μmol/gm OF INK AND NODULE TESTING OF EXAMPLE D INKS

| | | | | column | | | | |
|---|---|---|---|---|---|---|---|---|
| ink/type | 1 polymer | 2 equiv. polymer acid | 3 equiv. inorganic base | 4 equiv. organic base | 5 total base/ polymer acid (3 + 4)/2 ≧150% | 6 organic base/ inorganic base (4/3) ≧1 | 7 fresh ink nodules? | 8 incubated ink nodules? | 9 ejections to stabilize velocity |
| requirement | | | | | ≧150% | ≧1 | no | no | |
| D1/C | P2 | 15.3 | 13.0 | 0.0 | 85% | 0.00 | yes | yes | $2 \times 10^6$ |
| D2/C | P2 | 15.3 | 13.0 | 3.4 | 107% | 0.25 | yes | yes | $3 \times 10^6$ |
| D3/C | P2 | 15.3 | 13.0 | 6.7 | 129% | 0.51 | no | yes | $1 \times 10^6$ |
| D4/Inv | P2 | 15.3 | 13.0 | 13.4 | 172% | 1.03 | no | no | $1 \times 10^6$ |
| D5/Inv | P2 | 15.3 | 13.0 | 26.8 | 260% | 2.06 | no | no | $1 \times 10^6$ |
| D6/C | none | 0.0 | 0.0 | 13.4 | none | none | no | no | $5 \times 10^6$ |
| D7/C | P3 | 19.4 | 16.5 | 13.4 | 154% | 0.81 | no | no | $7 \times 10^6$ |
| D8/C | none | 0.0 | 0.0 | 0.0 | none | none | no | no | $5 \times 10^6$ |
| D9/Inv | P1 | 10.7 | 9.1 | 13.4 | 210% | 1.48 | no | no | $2 \times 10^6$ |
| D10/C | P1 | 32.1 | 27.3 | 13.4 | 127% | 0.49 | no | yes | $1 \times 10^6$ |
| D11/C | P1 | 53.4 | 45.4 | 13.4 | 110% | 0.30 | yes | yes | $1 \times 10^6$ |

* Inks D1-D11 contain self-disersing carbon black pigment dispersion having >11% volatile surface functional groups.

The above results show that the black inks containing a self-dispersed carbon black with >11% volatile surface functional groups and a low acid water soluble polymer had resistance to nodule formation after incubation when the total equivalents of base were greater than the 150% of the equivalents of polymer acid and the organic base equivalents were greater than the inorganic base equivalents. Thus, when the requirements of column 5 and 6 are met, for inks D4, D5, and D9 the present invention is realized. No nodules were formed without the polymer or with the high acid number polymer P3, however these inks demonstrated a longer time to stabilize the velocity.

Example E

Black inks made from >11% volatile surface functional groups self-dispersed carbon black and water soluble polymer are improved against pH drift in incubation with the addition of an organic base in an amount that exceeds the inorganic base.

Comparative Ink E1

To prepare the Ink E1, 86.5g of self-dispersed carbon black dispersion CW-3 from Orient Corporation of America (13% active), 10 g of dietbylene glycol, 20 g of glycerol, 10 g of 1,5-pentanediol, 10 g of TERGITOL™ 15-S-12 surfactant from Dow Chemical Company (diluted to 10% wt), 3.6 g of triethanolamine (20% active), and 4.03 g of water soluble polymer P1 (24.8% active) were added together with distilled water so that the final weight of the ink was 250.0 g. The final ink contained 4.5% carbon, 4% diethylene glycol, 8% glycerol, 4% 1,5-pentanediol, 0.4% TERGITOL™ 15-S-12, 0.29% triethanolamine, 0.4% water soluble polymeric binder P1, and had a final pH of 8.4.

Comparative Ink E2

Ink E2 was prepared similarly to Ink E1 except potassium hydroxide was added in place of triethanolamine such that the final ink pH was 8.4, the same as ink E1.

The fresh inks of Example E were placed into high density polyethylene bottles and incubated for 1 week at 80 degrees Celsius. The pH was measured and compared to the fresh pH. The results are shown in Table 5.

TABLE 5

FRESH AND INCUBATED PH FOR INKS IN EXAMPLE E

| Ink/Type | equiv. polymer acid | equiv. inorganic base | equiv. organic base | total base/polymer acid | organic base/inorganic base | fresh pH | incubated pH |
|---|---|---|---|---|---|---|---|
| E1/inv | 10.7 | 9.1 | 19.3 | 265% | 2.13 | 8.4 | 7.8 |
| E2/C | 10.7 | 17.8 | 0.0 | 167% | 0.00 | 8.4 | 7.4 |

The above results show that inks containing a self-dispersed carbon black with >11% volatile surface functional groups and a water soluble polymer are more stable to changes in pH after incubation when the equivalents of an organic base are greater than the equivalents of an inorganic base.

Example F

Black inks made from >11% volatile surface functional groups self-dispersed carbon black and water soluble polymer are improved against pH drift in incubation with the addition of an organic base in an amount that exceeds the inorganic base.

Comparative Ink F1

To prepare the Ink F1, 102.4 g of self-dispersed carbon black dispersion CW-3 from Orient Corporation of America (13.2% active), 27 g of diethylene glycol, 9 g of glycerol, 9 g polyethylene glycol 400 (Dow Chemical Company), 12 g of TERGITOL™ 15-S-12 surfactant from Dow Chemical Company (10% active), 12 g N,N-bis(2-hydroxyethyl)glycine (5% active), 5.7 g potassium hydroxide (5.6% active), and 4.8 g of water soluble polymer P1 (25.0% active) were added together with distilled water so that the final weight of the ink was 300.0 g. The final ink contained 4.5% carbon, 9% diethylene glycol, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.5.

Inventive Ink F2

Ink F2 was prepared similarly to Ink F1 except 19.5 g potassium carbonate (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.5.

Comparative Ink F3

To prepare the Ink F3, 102.4 g of self-dispersed carbon black dispersion CW-3 from Orient Corporation of America (13.2% active), 27 g of 2-pyrrolidinone, 9 g of glycerol, 9 g polyethylene glycol 400 (Dow Chemical Company), 12 g of TERGITOL™ 15-S-12 surfactant from Dow Chemical Company (10% active), 12 g N,N-bis(2-hydroxyethyl)glycine (5% active), 5.3 g potassium hydroxide (5.6% active), and 4.8 g of water soluble polymer P1 (25.0% active) were added together with distilled water so that the final weight of the ink was 300.0 g. The final ink contained 4.5% carbon, 9% 2-pyrrolidinone, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.5.

Inventive Ink F4

Ink F4 was prepared similarly to Ink F3 except 17.9 g potassium carbonate (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.5.

Comparative Ink F5

To prepare the Ink F5, 102.4 g of self-dispersed carbon black dispersion CW-3 from Orient Corporation of America (13.2% active), 27 g of diethylene glycol, 9 g of glycerol, 9 g polyethylene glycol 400 (Dow Chemical Company), 12 g of TERGITOL™ 15-S-12 surfactant from Dow Chemical Company (10% active), 24 g N,N-bis(2-hydroxyethyl)glycine (5% active), 7.4 g potassium hydroxide (5.6% active), and 4.8 g of water soluble polymer P1 (25.0% active) were added together with distilled water so that the final weight of the ink was 300.0 g. The final ink contained 4.5% carbon, 9% diethylene glycol, 3% glycerol, 3% polyethylene glycol 400, 0.4% TERGITOL™ 15-S-12, 0.4% N,N-bis(2-hydroxyethyl)glycine, and 0.4% water soluble polymeric binder P1. The final ink pH was 8.5.

Inventive Ink F6

Ink F6 was prepared similarly to Ink F5 except 22.3 g potassium carbonate (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.5.

All fresh inks of Example F were placed into high density polyethylene bottles and incubated for I week at 80 degrees Celsius. The pH was measured and compared to the fresh pH. The results are shown in Table 6.

TABLE 6

FRESH AND INCUBATED PH FOR INKS IN EXAMPLE F

| ink/type | equiv. polymer acid | equiv. inorganic base | equiv. organic base | total base/ polymer acid | organic base/ inorganic base | fresh pH | incubated pH |
|---|---|---|---|---|---|---|---|
| F1/C | 10.7 | 28.1 | 12.3 | 378% | 0.44 | 8.50 | 7.92 |
| F2/Inv | 10.7 | 9.1 | 35.8 | 420% | 3.94 | 8.50 | 8.22 |
| F3/C | 10.7 | 26.7 | 12.3 | 365% | 0.46 | 8.50 | 7.72 |
| F4/Inv | 10.7 | 9.1 | 33.8 | 402% | 3.73 | 8.50 | 8.10 |
| F5/C | 10.7 | 33.8 | 24.5 | 546% | 0.72 | 8.50 | 7.96 |
| F6/Inv | 10.7 | 9.1 | 51.4 | 566% | 5.66 | 8.50 | 8.34 |

By comparing the incubation pH of Inks F1 to F2, F3 to F4, and F5 to F6, the above results show that inks containing a self-dispersed carbon black with >11% volatile surface functional groups and a water soluble polymer are more stable to changes in pH after incubation when the equivalents of an organic base are greater than the equivalents of an inorganic base.

Example G

Black inks made from >11% volatile surface functional groups self-dispersed carbon black and water soluble polymer are improved against jetting velocity loss with the addition of an organic base in an amount that exceeds the inorganic base.

Comparative Ink G1

To prepare the Ink G1, 34.1 g of self-dispersed carbon black dispersion CW-3 from Orient Corporation of America (13.2% active), 9 g of diethylene glycol, 3 g of glycerol, 3 g polyethylene glycol 400 (Dow Chemical Company), 4 g of TERGITOL™ 15-S-12 surfactant from Dow Chemical Company (10% active), 0.6 g potassium hydroxide (5.6% active), and 1.6 g of water soluble polymer P1(25.0% active) were added together with distilled water so that the final weight of the ink was 100.0 g. The final ink contained 4.5% carbon, 9% diethylene glycol, 3% glycerol, 3% polyethylene glycol 400, 0.4% TERGITOL™ 15-S-12, and 0.4% water soluble polymeric binder P1. The final ink pH was 8.0.

Inventive Ink G2

Ink G2 was prepared similarly to Ink G1 except 4.0 g tris(hydroxymethyl)aminomethane (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% tris(hydroxymethyl)aminomethane, and 0.4% water soluble polymeric binder P1. The final ink pH was 8.0.

Inventive Ink G3

Ink G3 was prepared similarly to Ink G1 except 2.1 g potassium carbonate (5% active) was added in place of the potassium hydroxide. The final ink contained 4.5% carbon, 9% diethylene glycol, 3% glycerol, 3% polyethylene glycol 400, 0.4% TERGITOL™ 15-S- 12, 0.1% potassium carbonate, and 0.4% water soluble polymeric binder P1. The final ink pH was 8.3.

Inventive Ink G4

Ink G4 was prepared similarly to Ink G1 except 4.0 g N,N-bis(2-hydroxyethyl)glycine (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% N,N-bis(2-hydroxyethyl)glycine, and 0.4% water soluble polymeric binder P1. The final ink pH was 8.0.

Inventive Ink G5

Ink G5 was prepared similarly to Ink G1 except 6.0 g N-tris(hydroxymethyl)-2-aminopropane sulfonic acid (5% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% N-tris(hydroxymethyl)-2-aminopropane sulfonic acid, and 0.4% water soluble polymeric binder P1. The final ink pH was 8.0.

Inventive Ink G6

Ink G6 was prepared similarly to Ink G1 except 1.0 g triethanolamine (20% active) was added in place of the potassium hydroxide. The final ink contained 4.5% carbon, 9% diethylene glycol, 3% glycerol, 3% polyethylene glycol 400, 0.4% TERGITOL™ 15-S-12, 0.2% triethanolamine, and 0.4% water soluble polymeric binder P1. The final ink pH was 8.0.

Inks were also evaluated on a drop performance fixture utilizing a commercial Kodak printhead. The operating voltage was held at 18 percent over the threshold voltage (minimum voltage needed to cause ejection of an ink droplet) of the printhead. The transit time for a drop of ink traveling 0.3 mm was recorded based on the signal captured by a laser detector. The drop velocity was then calculated based on this transit time. Under the above conditions, the inks were fired at 10 kHz from four separate nozzles for up to $2 \times 10^7$ firing events. All inks showed at least some change in velocity over the course of jetting, and the percent velocity change was recorded. In this case, a lower percent velocity change would be beneficial to printer performance.

TABLE 7

LONG TERM JETTING OF INKS IN EXAMPLE G

| ink/type | equiv. polymer acid | equiv. inorganic base | equiv. organic base | total base/ polymer acid | organic base/ inorganic base | percent velocity change |
|---|---|---|---|---|---|---|
| G1/C | 10.7 | 14.6 | 0.0 | 136% | 0.00 | −27% |
| G2/Inv | 10.7 | 9.1 | 16.5 | 239% | 1.81 | −8% |
| G3/Inv | 10.7 | 9.1 | 12.1 | 198% | 1.33 | −14% |
| G4/Inv | 10.7 | 9.1 | 12.3 | 200% | 1.35 | −3% |
| G5/Inv | 10.7 | 9.1 | 12.3 | 200% | 1.35 | +1% |
| G6/Inv | 10.7 | 9.1 | 13.4 | 210% | 1.48 | −6% |

By comparing the percent velocity change of Ink G1 with Inks G2 to G6, the above results show that inks containing a self-dispersed carbon black with >11% volatile surface functional groups and a water soluble polymer have more stable long term jetting when the equivalents of an organic base are greater than the equivalents of an inorganic base.

The invention has been described in detail with particular reference to certain preferred embodiments thereof, but it will be understood that variations and modifications can be effected within the spirit and scope of the invention. The entire content of the patents and publications referred to in this document are incorporated herein by reference.

PARTS LIST 10 inkjet printer
12 image data source
18 ink tanks
20 recording medium supply
22 printed media collection
30 printhead
40 protective cover 100 carriage
215 optical sensor
302 media direction
303 print region
304 media direction
312 feed roller
313 forward direction
320 pickup roller(s)
322 turn roller(s)
323 idler roller(s)
324 discharge roller(s)
325 star wheel(s)
350 media transport path
360 media supply tray
371 media sheet
375 further optical sensor
380 media output tray
390 printed media sheet

The invention claimed is:

1. An inkjet printing system comprising an inkjet printer and an inkjet ink comprising water, a self-dispersing carbon black pigment, and a water soluble polymer containing carboxylate groups; wherein:
the carbon black pigment comprises greater than 11 weight % volatile surface functional groups, and
the ink also contains an organic base having a pKa>7.5 and an optional inorganic base in combined amounts sufficient to provide alkaline equivalents of at least 150% of the acid equivalents of the water soluble polymer;
provided the equivalents of the organic base are greater than or equal to the equivalents of the inorganic base, such that the ratio of equivalents of organic base to inorganic base is greater than or equal to 1:1.

2. The inkjet printing system of claim 1 wherein the self-dispersing carbon black pigment comprises greater than 15 weight % volatile surface functional groups.

3. The inkjet printing system of claim 1 wherein the self-dispersing carbon black pigment comprises greater than 18 weight % volatile surface functional group.

4. The inkjet printing system of claim 1 wherein the self-dispersing carbon black pigment is anionically charged.

5. The inkjet printing system of claim 4 wherein the self-dispersing carbon black pigment is neutralized by sodium, potassium, lithium, or rubidium cation.

6. The inkjet printing system of claim 4 wherein the self-dispersing carbon black pigment comprises greater than 5 weight % volatile lactonic surface functional group content.

7. The inkjet printing system of claim 4 wherein the water-soluble polymer has an acid number of from 100 to 270.

8. The inkjet printing system of claim 7 wherein the water-soluble polymer has an acid number of from 100 to 250.

9. The inkjet printing system of claim 4 wherein the pKa of the organic base is less than 9.5.

10. The inkjet printing system of claim 1 wherein 50 weight % of the pigment particles have a particle size of less than 500 nm.

11. The inkjet printing system of claim 10 wherein 50 weight % of the pigment particles have a particle size of less than 200 nm.

12. The inkjet printing system of claim 1 wherein the total amount of pigment is 0.1 weight % to 6.0 weight % of the ink.

13. The inkjet printing system of claim 1 wherein the water-soluble polymer has a weight average molecular weight of from 4,000 to 40,000 Daltons.

14. The inkjet printing system of claim 1 wherein 75 to 100% of the acid groups on the polymer are neutralized by alkaline metal hydroxide.

15. The inkjet printing system of claim 14 wherein the alkaline metal hydroxide is lithium hydroxide, sodium hydroxide, or potassium hydroxide, or a mixture thereof.

16. The inkjet printing system of claim 1 wherein the organic base is selected from a primary, secondary, or tertiary amine.

17. The inkjet printing system of claim 16 wherein the organic base is an amino acid.

18. The inkjet printing system of claim 1 wherein the organic base contains a sulfonic acid group.

19. An inkjet ink according to claim 1 wherein the organic base is a metal salt of a carbonate or bicarbonate.

20. The inkjet printing system of claim 1 wherein the organic base and the optional inorganic base are present in combined amounts sufficient to provide alkaline equivalents of at least 200% of the acid equivalents of the water soluble polymer.

21. The inkjet printing system of claim 1 wherein the ratio of organic base to inorganic base is greater than or equal to 1.5:1.

22. An inkjet ink comprising water, a self-dispersing carbon black pigment, and a water soluble polymer containing carboxylate groups, wherein
the carbon black pigment comprises greater than 7 weight % volatile surface functional groups; and
the ink also contains an organic base having a pKa>7.5 and an optional inorganic base in combined amounts sufficient to provide alkaline equivalents of at least 150% of the acid equivalents of the water soluble polymer;
provided the equivalents of the organic base are greater than or equal to the equivalents of the inorganic base, such that the ratio of equivalents of organic base to inorganic base is greater than or equal to 1:1.

23. The inkjet ink of claim 22 wherein the organic base and the optional inorganic base are present in combined amounts sufficient to provide alkaline equivalents of at least 200% of the acid equivalents of the water soluble polymer.

24. The inkjet ink of claim 22 wherein the ratio of organic base to inorganic base is greater than or equal to 1.5:1.

25. A method for printing an inkjet image comprising:
I) providing an aqueous inkjet ink comprising: water, a self-dispersing carbon black pigment, and a water soluble polymer containing carboxylate groups;
wherein the carbon black pigment comprises greater than 11 weight % volatile surface functional groups; and
wherein the ink contains an organic base having a pKa>7.5 and an optional inorganic base in combined amounts sufficient to provide alkaline equivalents of at least 150% of the acid equivalents of the water soluble polymer;
provided the equivalents of the organic base are greater than or equal to the equivalents of the inorganic base, such that the ratio of equivalents of organic base to inorganic base isgreater than or equal to 1:1; and
II) jetting the inkjet ink in the form of ink drops onto a recording element to form a printed image.

26. An inkjet printing system, comprising an inkjet printer responsive to digital signals and containing an ink composition comprising: water, a self-dispersing carbon black pigment, and a water soluble polymer containing carboxylate groups:
wherein the carbon black pigment comprises greater than 11 weight % volatile surface functional groups; and
wherein the ink contains an organic base having a pKa>7.5 and an optional inorganic base in combined amounts sufficient to provide alkaline equivalents of at least 150% of the acid equivalents of the water soluble polymer, and provided the equivalents of the organic base are greater than or equal to the equivalents of the inorganic base, such that the ratio of equivalents of organic base to inorganic base is greater than or equal to 1:1.

* * * * *